United States Patent
Liu et al.

(10) Patent No.: US 12,461,591 B2
(45) Date of Patent: Nov. 4, 2025

(54) CONTROL METHOD AND APPARATUS FOR VIRTUAL REALITY DEVICE

(71) Applicants: Beijing BOE Optoelectronics Technology Co., Ltd., Beijing (CN); BOE Technology Group Co., Ltd., Beijing (CN)

(72) Inventors: Zihe Liu, Beijing (CN); Jinbao Peng, Beijing (CN); Jinghua Miao, Beijing (CN); Xuefeng Wang, Beijing (CN); Longhui Wang, Beijing (CN); Xi Li, Beijing (CN)

(73) Assignees: Beijing BOE Optoelectronics Technology Co., Ltd., Beijing (CN); Beijing BOE Technology Development Co., LTD., Beijing (CN)

(*) Notice: Subject to any disclaimer, the term of this patent is extended or adjusted under 35 U.S.C. 154(b) by 896 days.

(21) Appl. No.: 17/761,520

(22) PCT Filed: Apr. 8, 2021

(86) PCT No.: PCT/CN2021/085958
§ 371 (c)(1),
(2) Date: Mar. 17, 2022

(87) PCT Pub. No.: WO2021/227714
PCT Pub. Date: Nov. 18, 2021

(65) Prior Publication Data
US 2022/0365594 A1  Nov. 17, 2022

(30) Foreign Application Priority Data
May 15, 2020 (CN) .......... 202010414663.3

(51) Int. Cl.
*G06F 3/01* (2006.01)
*G02B 27/00* (2006.01)

(52) U.S. Cl.
CPC ......... *G06F 3/013* (2013.01); *G02B 27/0081* (2013.01)

(58) Field of Classification Search
CPC .. G06F 3/013; G02B 27/0081; G02B 27/0172
(Continued)

(56) References Cited

U.S. PATENT DOCUMENTS

2001/0046131 A1  11/2001  Hoelen et al.
2013/0118114 A1   5/2013  Brailsford et al.
(Continued)

FOREIGN PATENT DOCUMENTS

CN  1199077 C     4/2005
CN  104565988 A   4/2015
(Continued)

OTHER PUBLICATIONS

Office action dated Apr. 16, 2023 for corresponding CN application 202010414663.3.

*Primary Examiner* — Stephone B Allen
*Assistant Examiner* — Boutsikaris Leonidas
(74) *Attorney, Agent, or Firm* — Workman Nydegger (57) ABSTRACT

Disclosed are a control method and apparatus for a virtual reality device. The method includes acquiring vision information of a current user that uses a virtual reality device; and according to the vision information of the current user, adjusting the distance between a lens in the virtual reality device and the eyes of the current user, and the distance between the field of view angle of each virtual camera and adjacent virtual cameras.

15 Claims, 5 Drawing Sheets

(58) Field of Classification Search
USPC .......................................................... 359/823
See application file for complete search history.

(56) References Cited

U.S. PATENT DOCUMENTS

| | | | |
|---|---|---|---|
| 2015/0103522 A1 | 4/2015 | Liu et al. | |
| 2016/0018591 A1 | 1/2016 | Lee | |
| 2016/0334565 A1 | 11/2016 | Wang | |
| 2017/0340200 A1 | 11/2017 | Blaha et al. | |
| 2018/0275367 A1* | 9/2018 | Lim .................... | G02B 25/004 |
| 2019/0129181 A1 | 5/2019 | Polcak et al. | |
| 2019/0246889 A1 | 8/2019 | Marin et al. | |
| 2020/0124852 A1 | 4/2020 | Zhou et al. | |

FOREIGN PATENT DOCUMENTS

| | | | | |
|---|---|---|---|---|
| CN | 103926746 B | | 6/2016 | |
| CN | 205903239 U | | 1/2017 | |
| CN | 107167924 A | | 9/2017 | |
| CN | 107260505 A | | 10/2017 | |
| CN | 109189215 A | | 1/2019 | |
| CN | 109283997 A | | 1/2019 | |
| CN | 109521871 A | * | 3/2019 | ............. G06F 3/013 |
| CN | 109964167 A | | 7/2019 | |
| CN | 110412796 A | | 11/2019 | |
| CN | 111596763 A | | 8/2020 | |
| TW | 201604625 A | | 2/2016 | |

* cited by examiner

CONTROL METHOD AND APPARATUS FOR VIRTUAL REALITY DEVICE

CROSS REFERENCE TO RELATED APPLICATIONS

The present disclosure is a US National Stage of International Application No. PCT/CN2021/085958, filed on Apr. 8, 2021, which claims priority to Chinese Patent Application No. 202010414663.3, entitled "CONTROL METHOD AND APPARATUS FOR VIRTUAL REALITY DEVICE", filed to the Chinese Patent Office on May 15, 2020, the entire contents of which are incorporated herein by reference.

FIELD

The present disclosure relates to the field of virtual reality, in particular to a control method, virtual reality device and storage medium thereof.

BACKGROUND

With the development of virtual reality (VR) technology, there are a lot of virtual reality devices, so that people can reflect virtual scenes through the virtual reality devices.

SUMMARY

A control method for a virtual reality device provided by an embodiment of the present disclosure, including: acquiring vision information of a current user using the virtual reality device; and adjusting a distance between a lens in the virtual reality device and an eye of the current user, a field of view of each virtual camera and a spacing between adjacent virtual cameras according to the vision information of the current user.

Optionally, in the embodiment of the present disclosure, the adjusting the distance between the lens in the virtual reality device and the eye of the current user, the field of view of the each virtual camera and the spacing between the adjacent virtual cameras according to the vision information of the current user, further includes: determining an imaging plane movement amount of an imaging plane of the lens relative to the eye of the current user according to the visual information of the current user; and adjusting the distance between the lens in the virtual reality device and the eye of the current user, the field of view of the each virtual camera and the spacing between the adjacent virtual cameras according to the imaging plane movement amount.

Optionally, in the embodiment of the present disclosure, the adjusting the distance between the lens in the virtual reality device and the eye of the current user, the field of view of the each virtual camera and the spacing between the adjacent virtual cameras, further includes: synchronously adjusting the distance between the lens in the virtual reality device and the eye of the current user, the field of view of the each virtual camera and the spacing between the adjacent virtual cameras, to make the distance between the lens and the eye of the current user, the field of view of the each virtual camera and the spacing between the adjacent virtual cameras reach target values at the same time.

Optionally, in the embodiment of the present disclosure, the synchronously adjusting the distance between the lens in the virtual reality device and the eye of the current user, the field of view of the each virtual camera and the spacing between the adjacent virtual cameras, further includes: determining a lens movement amount of the lens relative to the eye of the current user, a change amount of the field of view of the each virtual camera and a distance change amount of the spacing between the adjacent virtual cameras according to the imaging plane movement amount; and synchronously controlling movement of the lens, change of the field of view of the each virtual camera and reverse movement of the adjacent virtual cameras according to the lens movement amount and a lens movement rate, the change amount of the field of view of the each virtual camera and a change rate of the field of view, and a movement rate of the each virtual camera on a horizontal direction and the distance change amount.

Optionally, in the embodiment of the present disclosure, the change rate $v_{FOV}$ of the field of view satisfies a formula: $v_{FOV}=6v_{Lens}$; wherein $v_{Lens}$ represents the lens movement rate.

Optionally, in the embodiment of the present disclosure, the movement rate $v_{camera}$ of the each virtual camera on the horizontal direction satisfies a formula: $v_{camera}=0.02v_{Lens}$; wherein $v_{Lens}$ represents the lens movement rate.

Optionally, in the embodiment of the present disclosure, a target value $FOV_a$ of the field of view of the virtual camera after adjustment satisfies a formula: $FOV_a=FOV_P-6\Delta z$; wherein $FOV_P$ represents the field of view of the virtual camera in a default state, and $\Delta z$ represents the imaging plane movement amount.

Optionally, in the embodiment of the present disclosure, a target value $Dis_a$ of the spacing of the adjacent virtual cameras after adjustment satisfies a formula: $Dis_a=Dis_P+0.02\Delta z$; wherein $Dis_P$ represents the spacing of the adjacent virtual cameras in the default state, and $\Delta z$ represents the imaging plane movement amount.

An embodiment of the present disclosure further provides a virtual reality device, including: a processor and a memory storing at least one instruction, at least one program, a code set or an instruction set therein; wherein the processor, when loading and executing the at least one instruction, the at least one program, the code set or the instruction set, is caused to perform a control method for the virtual reality device.

An embodiment of the present disclosure further provides a computer non-transitory readable storage medium, storing a computer program, wherein the computer program, when executed by a processor, implements steps of the above control method for the virtual reality device.

DETAILED DESCRIPTION OF THE EMBODIMENTS

In order to make the objectives, technical solutions, and advantages of embodiments of the present disclosure clearer, the technical solutions of the embodiments of the present disclosure will be described clearly and completely in combination with the accompanying drawings of the embodiments of the present disclosure. Apparently, the described embodiments are some, but not all, embodiments of the present disclosure. Under the condition of no conflict, the embodiments in the present disclosure and the features in the embodiments can be combined with each other. Based on the described embodiments of the present disclosure, all other embodiments attainable by those ordinarily skilled in the art without involving any inventive effort are within the protection scope of the present disclosure.

Unless otherwise defined, the technical terms or scientific terms used in the present disclosure shall have the usual meanings understood by those with ordinary skills in the field to which the present disclosure belongs. "First", "second" and similar words used in the present disclosure do not indicate any order, quantity or importance, but are only used to distinguish different components. "Comprise" or "include" or other similar words mean that the element or item appearing before the word covers elements or items listed after the word and their equivalents, but does not exclude other elements or items. "Connecting" or "connected" or other similar words are not limited to physical or mechanical connections, but may include electrical connections, whether direct or indirect.

It needs to be noted that sizes and shapes of all figures in the drawings do not reflect a true scale and are only intended to illustrate contents of the present disclosure. Same or similar reference numbers denote same or similar elements or elements with same or similar function all the time.

A virtual reality device is usually a product that uses a combination of simulation technology and computer graphics, human-computer interface technology, multimedia technology, sensing technology, network technology and other technologies, and is a new means of human-computer interaction created with the help of computer and sensor technology. The virtual reality device uses computing simulation to generate a three-dimensional space virtual world, so as to provide users with visual, auditory and tactile sensory simulation, making the users feel that they are in a real world, and thus bring the users a new experience effect.

As the application of the virtual reality device becomes more and more widespread, how to improve the user experience and increase the practical functions of the virtual reality device is also one of the development directions of the virtual reality device. Usually, in order to be suitable for users with different myopia, the virtual reality device generally has a function of adjusting a focal length, which is mainly used to adjust a distance between a lens and a display by adjusting a gear on the virtual reality device, so that the users with different myopia can see a clear display picture.

However, by adjusting the distance between the lens and the display, a virtual image imaging plane of the lens can be brought closer to a bright vision distance of the user, resulting in a smaller visible field of view, so that the content of an edge of the display picture will be sacrificed. Moreover, a position of the imaging plane changes while a parallax remains unchanged leading to binocular image fusion errors, and objects in the field of view may become blurred or unfocused. Therefore, user's sense of immersion and richness of contents of the experience will be weakened and the experience will be affected.

Figure 1:
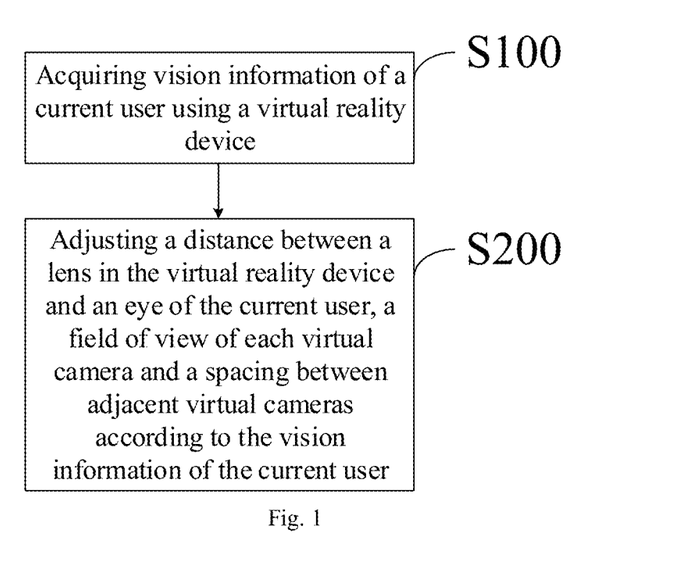
FIG. 1 is a flow diagram of a control method provided by an embodiment of the present disclosure.

Accordingly, a control method for a virtual reality device provided by an embodiment of the present disclosure, as shown in FIG. 1, may include the following steps.

S100, vision information of a current user using the virtual reality device is acquired.

S200, a distance between a lens in the virtual reality device and an eye of the current user, a field of view of each virtual camera and a spacing between adjacent virtual cameras are adjusted according to the vision information of the current user.

According to the control method for the virtual reality device provided by the embodiment of the present disclosure, the vision information of the current user using the virtual reality device can be acquired, so that the distance between the lens in the virtual reality device and the eye of the current user, the field of view of each virtual camera, and the spacing between the adjacent virtual cameras can be adjusted according to the vision information of the current user. This allows the virtual reality device to be suitable for people with different vision information. Moreover, by adjusting the distance between the lens in the virtual reality device and the eye of the current user, adjusting the field of view of each virtual camera and adjusting the spacing between the adjacent virtual cameras, an image distance, a parallax and the field of view in the VR experience can be coordinated, so that the problem of loss of field of view display and inability to focus when the image distance is reduced can be solved, and the experience effect of the current user of the virtual reality device can be optimized.

In specific implementation, in the embodiment of the present disclosure, the vision information may include vision data, for example, myopia. In this way, the vision data of the current user of the virtual reality device can be obtained, and the distance between the lens in the virtual reality device and the eye of the current user, the field of view of each virtual camera, and the spacing between the adjacent virtual cameras can be adjusted according to the vision data. Thus, the virtual reality device can be further adapted to people with different degrees of myopia, making it possible for myopic people to clearly see contents on a display film without wearing their original glasses for the myopia, which does not affect the use and greatly satisfies the needs of the user.

Figure 2:
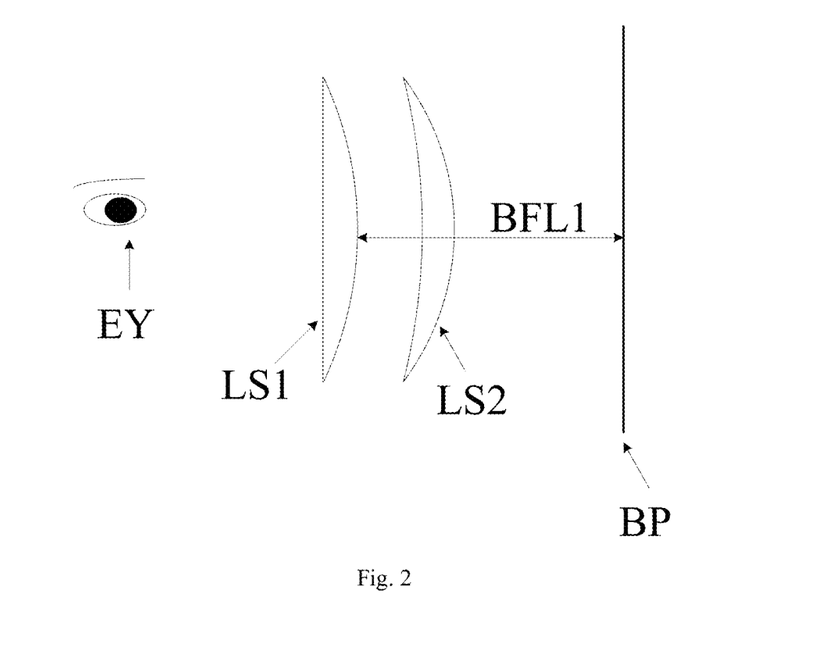
FIG. 2 is a partial schematic structural diagram of a virtual reality device provided by an embodiment of the present disclosure.

In some examples, a virtual reality device body may include a VR headset, VR glasses, a motion seat, etc. The present disclosure does not specifically limit the virtual reality device body. As shown in FIG. 2, the virtual reality device has lenses LS1 and LS2, an eye EY is located on a side, facing away from the lens LS2, of the lens LS1, and a screen is located on a side, facing away from the lens LS1, of the lens LS2. Exemplarily, the lenses LS1 and LS2 act as a lens set, and the virtual reality device may include two lens sets so that one eye corresponds to one lens set, and thus a distance between the lens LS1 in the virtual reality device and each eye EY of the current user can be adjusted, and a position of the imaging screen can be adjusted. Exemplarily, the lens LS2 may be fixed. Of course, the lens LS2 may also be movable and is not limited herein.

Figure 3:
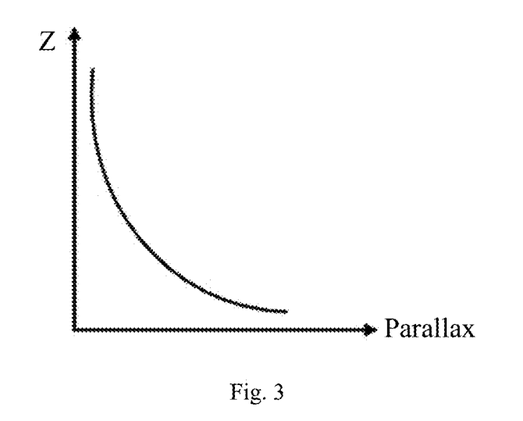
FIG. 3 is a schematic diagram of a relationship between a binocular parallax and an object depth provided by an embodiment of the present disclosure.

Combined with FIG. 2, a stepper motor can be adopted to control a distance BFL1 from the lens LS1 to the screen BP, to change an object distance and thus the image distance, to further change the position of the imaging screen. As shown in FIG. 3, a relationship between a binocular parallax and an object depth is represented. As shown in FIG. 3, the relationship between the binocular parallax and the object depth is inversely proportional. Therefore, the closer a point is to an imaging plane, the greater its parallax in left and right virtual cameras, and the further the point is from the imaging plane, the smaller its parallax in the left and right virtual cameras.

In some examples, the virtual reality device is provided with a virtual camera with a software end. A main function of this virtual camera is to take a picture in the field of view under a virtual scene according to set rendering parameters, and then render the obtained picture on the screen. Exemplarily, the virtual camera has a variety of adjustable rendering parameters (e.g., a parameter of the field of view, a projection mode parameter, a cropping plane parameter, a depth parameter, etc.). Moreover, the virtual camera can have rigid body properties and can be freely moved and rotated to be placed at any position in the virtual scene. Further, both self-contained parameter properties and position properties of this virtual camera can be controlled by scripts. In some examples, the virtual reality device can be provided with two virtual cameras. One virtual camera corresponds to one eye of the user and the other virtual camera corresponds to the other eye of the user. In practical application, the working principle of the virtual cameras can be essentially the same as that in related technologies and will not be described here.

Usually, some people are myopic and some are not, which makes the virtual reality device needs to adapt to the needs of most people. In practical application, the virtual reality device can be made to have parameters in a default state. For example, the distance between the lens LS1 in the virtual reality device and the eye EY of the user has a distance $BL_P$ in a default state, the virtual camera has a field of view $FOV_P$ in a default state, and the spacing of the adjacent virtual cameras has a spacing $Dis_P$ in a default state. The parameters in the default state can be determined based on users who are not myopic or users with low myopia (e.g., myopia less than 100 degrees). In this way, no additional adjustment is required when the obtained vision data of the current user corresponds to a non-myopic user or a user with low myopia, thus reducing power consumption. In practical application, the parameters in the default state can be designed and determined according to actual application requirements and are not limited here.

In specific implementation, in the embodiment of the present disclosure, the adjusting the distance between the lens in the virtual reality device and the eye of the current user, the field of view of each virtual camera and the spacing between the adjacent virtual cameras according to the vision information of the current user, further includes: determining an imaging plane movement amount of an imaging plane of the lens relative to the eye of the current user according to the visual information of the current user; and adjusting the distance between the lens in the virtual reality device and the eye of the current user, the field of view of each virtual camera and the spacing between the adjacent virtual cameras according to the imaging plane movement amount.

Exemplarily, a table of relationships between a plurality of different pieces of visual information and imaging plane movement amounts of the imaging plane of the lens relative to the eye of the user is pre-stored. For example, N pieces of visual information are pre-stored: Y-1, Y-2, Y-3, . . . Y-N. Each piece of visual information corresponds to an imaging plane movement amount, i.e., the visual information Y-1 corresponds to an imaging plane movement amount $\Delta xz$-1, the visual information Y-2 corresponds to an imaging plane movement amount $\Delta xz$-2, the visual information Y-3 corresponds to an imaging plane movement amount $\Delta xz$-3, and the visual information Y-N corresponds to an imaging plane movement amount $\Delta xz$-N. In specific implementation, the imaging plane movement amount of the lens in the virtual reality device relative to the eye of the current user can be determined by querying the pre-stored table of the relationships according to the obtained vision information of the current user. It should be noted that when the vision information is vision data, a table of relationships between a plurality of different vision data and the imaging plane movement amounts of the imaging plane of the lens relative to the eye of the user is pre-stored.

In specific implementation, in the embodiment of the present disclosure, the adjusting the distance between the lens in the virtual reality device and the eye of the current user, the field of view of each virtual camera and the spacing between the adjacent virtual cameras, further includes: synchronously adjusting the distance between the lens in the virtual reality device and the eye of the current user, the field of view of each virtual camera and the spacing between the adjacent virtual cameras, to make the distance between the lens and the eye of the current user, the field of view of each virtual camera and the spacing between the adjacent virtual cameras reach target values at the same time. In this way, correlation among the lens in the virtual reality device and the eye of the current user, the field of view of each virtual camera and the spacing between the adjacent virtual cameras can be improved in the process of adjustment, so that the chance of error in an image can be reduced and the clarity of the image can be increased, which can be more in line with use needs of the user and improve experience feeling of the user.

In specific implementation, in the embodiment of the present disclosure, the synchronously adjusting the distance between the lens in the virtual reality device and the eye of the current user, the field of view of each virtual camera and the spacing between the adjacent virtual cameras, further includes: determining a lens movement amount of the lens relative to the eye of the current user, a change amount of the field of view of each virtual camera and a distance change amount of the spacing between the adjacent virtual cameras according to the imaging plane movement amount; and synchronously controlling movement of the lens, change of the field of view of each virtual camera and reverse movement of the adjacent virtual cameras according to the lens movement amount and a lens movement rate, the change amount of the field of view of each virtual camera and a change rate of the field of view, and a movement rate of each virtual camera on a horizontal direction and the distance change amount.

Exemplarily, according to the imaging plane movement amount $\Delta z$, the lens movement amount $\Delta ls1$ of the lens LS1 relative to the eye of the current user can be determined, so that the lens movement amount $\Delta ls1$ can be adjusted at the distance $BL_P$ in the default state to obtain the target value $BL_a$ of the distance between the lens LS1 and the eye EY of the current user after adjustment, i.e., $BL_a=BL_P-\Delta ls1$.

Exemplarily, according to the imaging plane movement amount $\Delta z$, the change amount $6\Delta z$ of the field of view of each virtual camera can be determined, so that the change amount $6\Delta z$ of the field of view can be adjusted based on the $FOV_P$ of the virtual camera in the default state to obtain the target value $FOV_a$ of the field of view of the virtual camera after adjustment, i.e., $FOV_a$ satisfies a formula: $FOV_a=FOV_P-6\Delta z$.

Exemplarily, according to the imaging plane movement amount $\Delta z$, the distance change amount $0.02\Delta z$ of the spacing between the adjacent virtual cameras can be determined, so that the distance change amount $0.02\Delta z$ can be adjusted based on the spacing $Dis_P$ of the virtual camera in the default state to obtain the target value $Dis_a$ of the spacing between the adjacent virtual cameras after adjustment, i.e., $Dis_a$ satisfies a formula: $Dis_a=Dis_P+0.02\Delta z$.

It should be noted that, when the imaging plane movement amount corresponding to the current user is determined as one of the pre-stored imaging plane movement amounts Y-1, Y-2, Y-3, ... or Y-N according to the vision information of the current user, $\Delta z$ may be set as a value of one determined pre-stored imaging plane movement amount. For example, when the imaging plane movement amount $\Delta z$ corresponding to the current user is determined as $\Delta xz$-2, the imaging plane movement amount $\Delta z=\Delta xz$-2. The rest is the same and will not be described here.

In some examples, according to the lens movement amount, the stepper motor in a mechanical structure in the virtual reality device can be controlled to rotate, to drive the lens to move. If an angular velocity of rotation of the stepper motor is $\omega_0$, an angular velocity of driving the gear to rotate is $\omega_1$, so that a rate of driving the lens to move can be obtained, i.e., the lens movement rate is $v_{Lens}$. Of course, in practical application, a specific value of the lens movement rate $v_{Lens}$ can be designed and determined according to the needs of the actual application, and will not be limited here.

In some examples, the change rate $v_{FOV}$ of the field of view satisfies a formula: $v_{FOV}=6v_{Lens}$; where $v_{Lens}$ represents the lens movement rate. In this way, the change rate $v_{FOV}$ and the lens movement rate $v_{Lens}$ can be made to be relevant, so that the movement of the lens and the change of the field of view of each virtual camera can be controlled simultaneously.

In some examples, the movement rate $v_{camera}$ of the virtual camera on the horizontal direction satisfies a formula: $v_{camera}=0.02v_{Lens}$; where $v_{Lens}$ represents the lens movement rate. In this way, the movement rate $v_{camera}$ of the virtual camera on the horizontal direction and the lens movement rate $v_{Lens}$ can be made to be relevant, so that the movement of the lens and the reverse movement of the adjacent virtual cameras can be controlled simultaneously.

In specific implementation, through making the change rate $v_{FOV}$ of the field of view satisfy the formula: $v_{FOV}=6v_{Lens}$, and making the movement rate $v_{camera}$ of the virtual camera on the horizontal direction satisfy the formula: $v_{camera}=0.02v_{Lens}$, the change rate $v_{FOV}$ of each virtual camera, the movement rate $v_{camera}$ of the virtual camera on the horizontal direction and the lens movement rate $v_{Lens}$ can be made to be relevant, so that the movement of the lens, the change of the field of view of each virtual camera and the reverse movement of the adjacent virtual cameras can be controlled synchronously and coordinately.

The control method for the virtual reality device provided by the embodiment of the present disclosure is described below in conjunction with specific embodiments. Among them, the vision information is illustrated as an example of the vision data.

The control method for the virtual reality device provided by the embodiment of the present disclosure, may include the following steps.

(1) a vision information obtaining device measures the eye of the current user using the virtual reality device, to obtain the vision data of the eye of the current user using the virtual reality device.

(2) According to the vision data of the current user, the imaging plane movement amount corresponding to the vision data of the current user is found from the pre-stored table of relationships between the plurality of visual data and the imaging plane movement amounts of the imaging plane of the lens relative to the eye of the user. For example, the found imaging plane movement amount corresponding to the vision data of the current user is $\Delta xz$-2, $\Delta z=\Delta xz$-2.

(3) According to the imaging plane movement amount $\Delta z$, the lens movement amount $\Delta ls1$ of the lens LS1 relative to the eye of the current user can be determined.

And according to the imaging plane movement amount $\Delta z$, the change amount $6\Delta z$ of the field of view of each virtual camera can be determined.

And according to the imaging plane movement amount $\Delta z$, the distance change amount $0.02\Delta z$ of the spacing between the adjacent virtual cameras can be determined.

(4) According to the lens movement amount, the stepper motor in the mechanical structure in the virtual reality device can be controlled to rotate, thus driving the lens to move. If the angular velocity of rotation of the stepper motor is $\omega_0$, the angular velocity of driving the gear to rotate is $\omega_1$, so that the lens movement rate of driving the lens to move can be obtained as $v_{Lens}$.

And while the lens is moving, according to the change rate $v_{FOV}$ of the field of view (e.g., $v_{FOV}=6v_{Lens}$), the fields of view of the two virtual cameras are changed linearly.

And while the lens is moving and the fields of view of the two virtual cameras are being changed, according to the movement rate $v_{camera}$ of each virtual camera on the horizontal direction (e.g., $v_{camera}=0.02v_{Lens}$), the reverse movement of the two virtual cameras is controlled, the spacing between the two virtual cameras is changed, so that a focal point can be made to fall on the imaging plane.

When the lens stops moving, the fields of view of the two virtual cameras and the spacing between the two virtual cameras also reach the target values at the same time. The target value of the field of view of each virtual camera after adjustment is $FOV_a=FOV_P-6\Delta z$. The target value of the spacing between the two virtual cameras after adjustment is $Dis_a=Dis_P+0.02\Delta z$.

Exemplarily, in the process of adjustment, there is a correspondence between a change amount of adjustment of the field of view and a change amount of the movement of the virtual camera. For example, for each 1° change of the field of view, a movement amount of a relative position of the virtual camera is 300 mm.

Figure 4A:
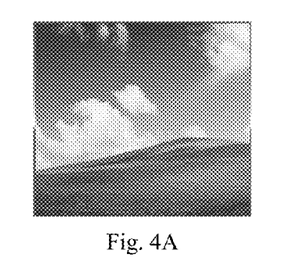
FIG. 4A is an image taken by a left-side virtual camera provided by an embodiment of the present disclosure before adjustment.
Figure 4B:
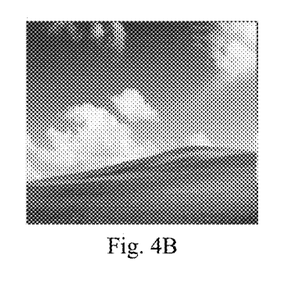
FIG. 4B is an image taken by a left-side virtual camera provided by an embodiment of the present disclosure after adjustment.
Figure 5A:
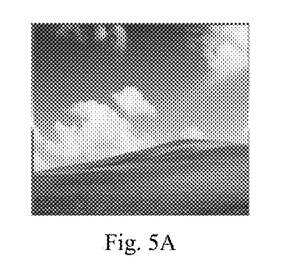
FIG. 5A is an image taken by a right-side virtual camera provided by an embodiment of the present disclosure before adjustment.
Figure 5B:
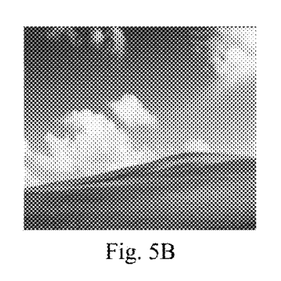
FIG. 5B is an image taken by a right-side virtual camera provided by an embodiment of the present disclosure after adjustment.
Figure 6A:
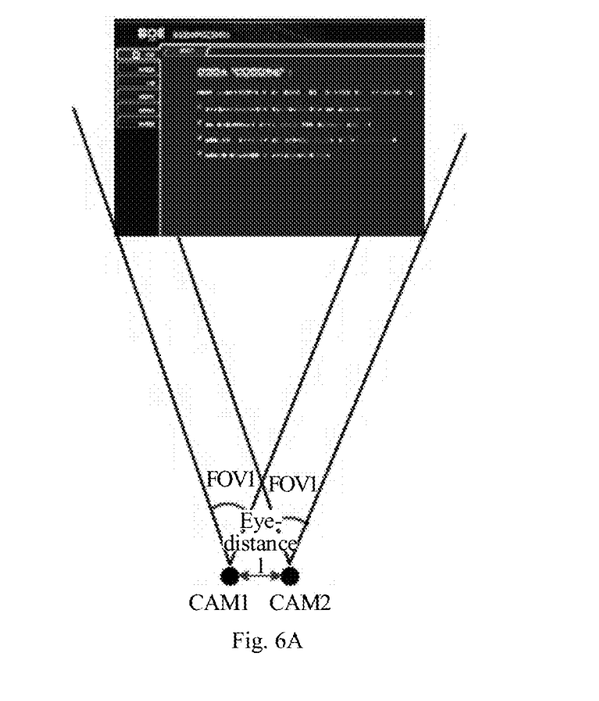
FIG. 6A is an image taken when a spacing between a left-side virtual camera and a right-side virtual camera provided by an embodiment of the present disclosure is 1.
Figure 6B:
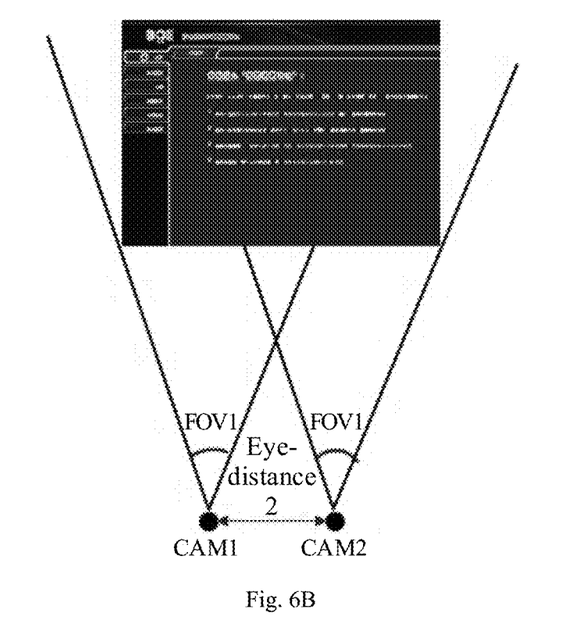
FIG. 6B is an image taken when a spacing between a left-side virtual camera and a right-side virtual camera provided by an embodiment of the present disclosure is 2.

And as shown in FIGS. 4A to 6B, FIG. 4A illustrates an image taken by a left-side virtual camera before adjustment, and FIG. 4B illustrates an image taken by the left-side virtual camera after adjustment. FIG. 5A illustrates an image taken by a right-side virtual camera before adjustment, and FIG. 5B illustrates an image taken by the right-side virtual camera after adjustment. FIG. 6A illustrates an image taken when a spacing between the left-side virtual camera and the right-side virtual camera is spacing 1, and FIG. 6B illustrates an image taken when the spacing between the left-side virtual camera and the right-side virtual camera is spacing 2. FOV1 represents a field of view of the left-side virtual camera CAM1, and FOV2 represents a field of view of the right-side virtual camera CAM2. Combined with FIGS. 4A to 6B, it can be seen that by adjusting the fields of view of and the spacing between the two virtual cameras, the problem of parallax mismatch and the field becoming smaller can be improved.

Figure 7A:
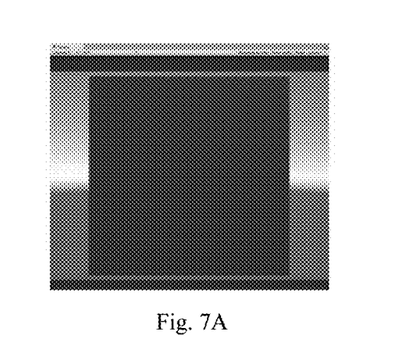
FIG. 7A is a schematic diagram of some fields of view provided by an embodiment of the present disclosure.
Figure 7B:
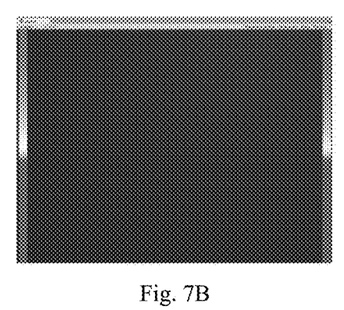
FIG. 7B is a schematic diagram of some other fields of view provided by an embodiment of the present disclosure.
Figure 7C:
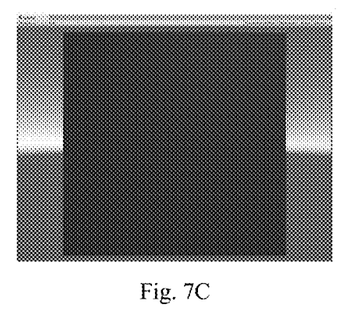
FIG. 7C is a schematic diagram of some other fields of view provided by an embodiment of the present disclosure.

And as shown in FIGS. 7A to 7C, FIG. 7A illustrates a visual field when the spacing between the two virtual cameras is 8 mm and the field of view of each virtual camera is 60°. FIG. 7B illustrates a visual field when the spacing between the two virtual cameras is 6 mm and the field of view of each virtual camera is 60°. FIG. 7C illustrates a visual field when the spacing between the two virtual cameras is 8 mm and the field of view of each virtual camera is 75°. Combined with what are shown in FIGS. 7A to 7C, it can be seen that the visual field can be changed by adjusting the fields of view of and the spacing between the two virtual cameras, and thus the problem of parallax mismatch and the field becoming smaller can be solved.

Based on the same inventive concept, an embodiment of the present disclosure further provides a virtual reality device, which may include: a virtual reality device body and a processor. The processor is configured to obtain vision information of a current user using the virtual reality device; and adjust a distance between a lens in the virtual reality device and an eye of the current user, a field of view of each virtual camera and a spacing between adjacent virtual cameras according to the vision information of the current user.

Exemplarily, the processor may be integrated with the virtual reality device. Other essential components of the virtual reality device should be understood by those of ordinary skill in the art and are not described herein, nor should they be taken as limitations of the present disclosure.

Based on the same inventive concept, an embodiment of the present disclosure further provides a computer readable storage medium. The computer readable storage medium stores a computer program. The computer program, when executed by the processor, implements the steps of the above control method for the virtual reality device provided by embodiment of the present disclosure. Specifically, the present disclosure may take a form of a computer program product implemented on one or more computer usable storage media (including, but not limited to, a disk memory and an optical memory, etc.) containing computer usable program code therein.

It should be understood by those of skill in the art that embodiments of the present disclosure may be provided as methods, systems, or computer program products. Accordingly, the present disclosure may take a form of an entirely hardware embodiment, an entirely software embodiment, or an embodiment combining software and hardware aspects. Further, the present disclosure may take a form of a computer program product implemented on one or more computer usable storage media (including, but not limited to, a disk memory, a CD-ROM, and an optical memory, etc.) containing computer usable program code therein.

The present disclosure is described with reference to flow diagrams and/or block diagrams of methods, devices (systems), and computer program products according to the embodiments of the present disclosure. It should be understood that each process and/or block in the flow diagrams and/or block diagrams, and the combination of processes and/or blocks in the flow diagrams and/or block diagrams, may be implemented by computer program instructions. These computer program instructions may be provided to a processor of a general purpose computer, a specialized computer, an embedded processor, or other programmable data processing device to produce a machine, so that the instructions executed by the processor of the computer or other programmable data processing device produce an apparatus for implementing functions specified in one process or a plurality of processes in the flow diagrams and/or one block or a plurality of blocks in the block diagrams.

These computer program instructions may also be stored in a computer readable memory capable of directing the computer or other programmable data processing device to operate in a particular manner, so that the instructions stored in the computer readable memory produce a manufacture article including an instruction device that implements the functions specified in one process or a plurality of processes in the flow diagrams and/or one block or a plurality of blocks in the block diagrams.

These computer program instructions may also be loaded on the computer or other programmable data processing device, so that a series of operational steps are executed on the computer or other programmable device to produce computer-implemented processing, accordingly the instructions executed on the computer or other programmable device provide the steps used to perform the functions specified in one process or a plurality of processes in the flow diagrams and/or one block or a plurality of blocks in the block diagrams.

Although preferred embodiments of the present disclosure have been described, those of skill in the art can make additional changes and modifications to these embodiments once the basic inventive concepts are known. Therefore, the appended claims are intended to be construed to include the preferred embodiments and all changes and modifications that fall within the scope of the present disclosure.

It is clear that those of skill in the art can make various modifications and variations to the embodiments of the present disclosure without departing from the spirit and scope of the embodiments of the present disclosure. Thus, if these modifications and variations of the embodiments of the present disclosure fall within the scope of the claims of the present disclosure and their technical equivalents, the present disclosure is also intended to include such modifications and variations.

What is claimed is:

1. A control method for a virtual reality device, comprising:
   acquiring vision information of a current user using the virtual reality device; and
   adjusting a distance between a lens in the virtual reality device and an eye of the current user, a field of view of each of virtual cameras in the virtual reality device, and a spacing between adjacent virtual cameras according to the vision information of the current user;
   wherein the adjusting the field of view of each of the virtual cameras and the spacing between adjacent virtual cameras according to the vision information of the current user comprises:
   determining an imaging plane movement amount of an imaging plane of the lens relative to the eye of the current user according to the vision information of the current user;
   determining a change amount of the field of view of each of the virtual cameras and a distance change amount of the spacing between adjacent virtual cameras according to the imaging plane movement amount; and controlling the field of view of each of the virtual cameras and the spacing between adjacent virtual cameras according to the change amount of the field of view of each of the virtual cameras and a change rate of the field of view, and a movement rate of each of the virtual cameras on a horizontal direction and the distance change amount;

wherein the change rate $v_{FOV}$ of the field of view satisfies a formula: $v_{FOV}=6v_{Lens}$; wherein $v_{Lens}$ represents a lens movement rate.

2. The control method for the virtual reality device according to claim 1, wherein the adjusting the distance between the lens in the virtual reality device and the eye of the current user according to the vision information of the current user comprises:

adjusting the distance between the lens in the virtual reality device and the eye of the current user according to the imaging plane movement amount.

3. The control method for the virtual reality device according to claim 2, wherein the adjusting the distance between the lens in the virtual reality device and the eye of the current user according to the imaging plane movement amount comprises:

determining a lens movement amount of the lens relative to the eye of the current user according to the imaging plane movement amount; and controlling movement of the lens according to the lens movement amount and the lens movement rate.

4. The control method for the virtual reality device according to claim 1, wherein the movement rate $v_{camera}$ of each of the virtual cameras on the horizontal direction satisfies a formula: $v_{camera}=0.02v_{Lens}$; wherein $v_{Lens}$ represents the lens movement rate.

5. The control method for the virtual reality device according to claim 1, wherein a target value $FOV_a$ of the field of view of the virtual camera after adjustment satisfies a formula: $FOV_a=FOV_P-6\Delta z$; wherein $FOV_P$ represents the field of view of the virtual camera in a default state, the field of view of the virtual camera in the default state is determined based on users who are not myopic or users with myopia less than 100 degrees, and $\Delta z$ represents the imaging plane movement amount.

6. The control method for the virtual reality device according to claim 1, wherein a target value $Dis_a$ of the spacing of the adjacent virtual cameras after adjustment satisfies a formula: $Dis_a=Dis_P+0.02\Delta z$; wherein $Dis_P$ represents the spacing of the adjacent virtual cameras in a default state, the spacing of the adjacent virtual cameras in the default state is determined based on users who are not myopic or users with myopia less than 100 degrees, and $\Delta z$ represents the imaging plane movement amount.

7. A virtual reality device, comprising a processor and a memory storing at least one instruction, at least one program, a code set or an instruction set therein; wherein the processor, when loading and executing the at least one instruction, the at least one program, the code set or the instruction set, is caused to perform the control method for the virtual reality device according to claim 1.

8. A computer non-transitory readable storage medium, storing a computer program, wherein the computer program, when executed by a processor, implements the control method for the virtual reality device according to claim 1.

9. A control method for a virtual reality device, comprising:

acquiring vision information of a current user using the virtual reality device; and adjusting a distance between a lens in the virtual reality device and an eye of the current user, a field of view of each of virtual cameras in the virtual reality device, and a spacing between adjacent virtual cameras according to the vision information of the current user;

wherein the adjusting a distance between a lens in the virtual reality device and an eye of the current user, a field of view of each of virtual cameras in the virtual reality device, and a spacing between adjacent virtual cameras according to the vision information of the current user comprises:

determining an imaging plane movement amount of an imaging plane of the lens relative to the eye of the current user according to the vision information of the current user; and adjusting the distance between the lens in the virtual reality device and the eye of the current user, the field of view of each of the virtual cameras and the spacing between the adjacent virtual cameras according to the imaging plane movement amount;

wherein a target value $FOV_a$ of the field of view of the virtual camera after adjustment satisfies a formula: $FOV_a=FOV_P-6\Delta z$; wherein $FOV_P$ represents the field of view of the virtual camera in a default state, the field of view of the virtual camera in the default state is determined based on users who are not myopic or users with myopia less than 100 degrees, and $\Delta z$ represents the imaging plane movement amount.

10. The control method for the virtual reality device according to claim 9, wherein a target value $Dis_a$ of the spacing of the adjacent virtual cameras after adjustment satisfies a formula: $Dis_a=Dis_P+0.02\Delta z$; wherein $Dis_P$ represents the spacing of the adjacent virtual cameras in a default state, the spacing of the adjacent virtual cameras in the default state is determined based on users who are not myopic or users with myopia less than 100 degrees, and $\Delta z$ represents the imaging plane movement amount.

11. A virtual reality device, comprising a processor and a memory storing at least one instruction, at least one program, a code set or an instruction set therein; wherein the processor, when loading and executing the at least one instruction, the at least one program, the code set or the instruction set, is caused to perform the control method for the virtual reality device according to claim 9.

12. A computer non-transitory readable storage medium, storing a computer program, wherein the computer program, when executed by a processor, implements the control method for the virtual reality device according to claim 9.

13. A control method for a virtual reality device, comprising:

acquiring vision information of a current user using the virtual reality device; and adjusting a distance between a lens in the virtual reality device and an eye of the current user, a field of view of each of virtual cameras in the virtual reality device, and a spacing between adjacent virtual cameras according to the vision information of the current user;

wherein the adjusting a distance between a lens in the virtual reality device and an eye of the current user, a field of view of each of virtual cameras in the virtual reality device, and a spacing between adjacent virtual cameras according to the vision information of the current user comprises:

determining an imaging plane movement amount of an imaging plane of the lens relative to the eye of the current user according to the vision information of the current user; and adjusting the distance between the lens in the virtual reality device and the eye of the current user, the field of view of each of the virtual cameras and the spacing between the adjacent virtual cameras according to the imaging plane movement amount;

wherein a target value $Dis_a$ of the spacing of the adjacent virtual cameras after adjustment satisfies a formula: $Dis_a = Dis_P + 0.02\Delta z$; wherein $Dis_P$ represents the spacing of the adjacent virtual cameras in a default state, the spacing of the adjacent virtual cameras in the default state is determined based on users who are not myopic or users with myopia less than 100 degrees, and $\Delta z$ represents the imaging plane movement amount.

14. A virtual reality device, comprising a processor and a memory storing at least one instruction, at least one program, a code set or an instruction set therein; wherein the processor, when loading and executing the at least one instruction, the at least one program, the code set or the instruction set, is caused to perform the control method for the virtual reality device according to claim 13.

15. A computer non-transitory readable storage medium, storing a computer program, wherein the computer program, when executed by a processor, implements the control method for the virtual reality device according to claim 13.

* * * * *